Nov. 22, 1955    M. D. JENNINGS    2,724,313
TWO-WAY DISK PLOW
Filed June 13, 1951    3 Sheets-Sheet 3

INVENTOR
MARVIN D. JENNINGS
Paul O. Pippel
ATTORNEY

United States Patent Office 2,724,313
Patented Nov. 22, 1955

2,724,313

TWO-WAY DISK PLOW

Marvin D. Jennings, Memphis, Tenn., assignor to International Harvester Company, a corporation of New Jersey Application June 13, 1951, Serial No. 231,354

14 Claims. (Cl. 97—31)

This invention relates to agricultural implements and particularly to plows. More specifically the invention concerns a tractor mounted disk plow of the two-way or reversible type.

An object of the invention is the provision of an improved reversible disk plow adapted to be attached to a tractor to be supported thereon in transport and to be propelled thereby in operation.

A disk plow of the type with which this invention is particularly concerned comprises generally a frame extending longitudinally and attached to the rear of the tractor or the like, and a gang of disks positioned diagonal to the direction of travel, the width of cut being determined in part by the spacing between the disks and in part by the angle which the disk assumes relative to the direction of travel. The gang of disks is reversed by swinging the gang laterally about a vertical pivot so that the disks are arranged on the opposite diagonal for plowing in a reverse direction. By the use of such a two-way or reversible disk plow, the tractor operator can reverse his direction of operation at each end of the field and still throw the dirt in the same direction.

Another object of the present invention is to provide improved mechanism for supporting a disk plow gang upon a frame wherein means are provided for guiding the disk gang as it swings laterally from one operating position to the other.

A further object of the invention is to provide improved reversing mechanism for shifting the position of the disk gang relative to the supporting frame from one operating position to the other.

Another object of the invention is to provide improved reversing mechanism for the disk gang of a reversible disk plow wherein novel means are provided for transmitting motion from a power source to the disk gang for shifting it alternately from one operating position to another.

A still further object of the invention is to provide in reversing mechanism for a two-way disk plow, means responsive to movement of the disk gang to one of its operating positions for placing the reversing mechanism in position to shift the disk gang to its alternative position upon the application of power to reverse the direction of operation of the plow.

Other objects and advantages of the invention will become clear from the following detailed description when read in conjunction with the accompanying drawings, wherein:

Fig. 4 is a sectional elevation on the line 4—4 of Fig. 1 on a larger scale than Fig. 1.

Figure 1:
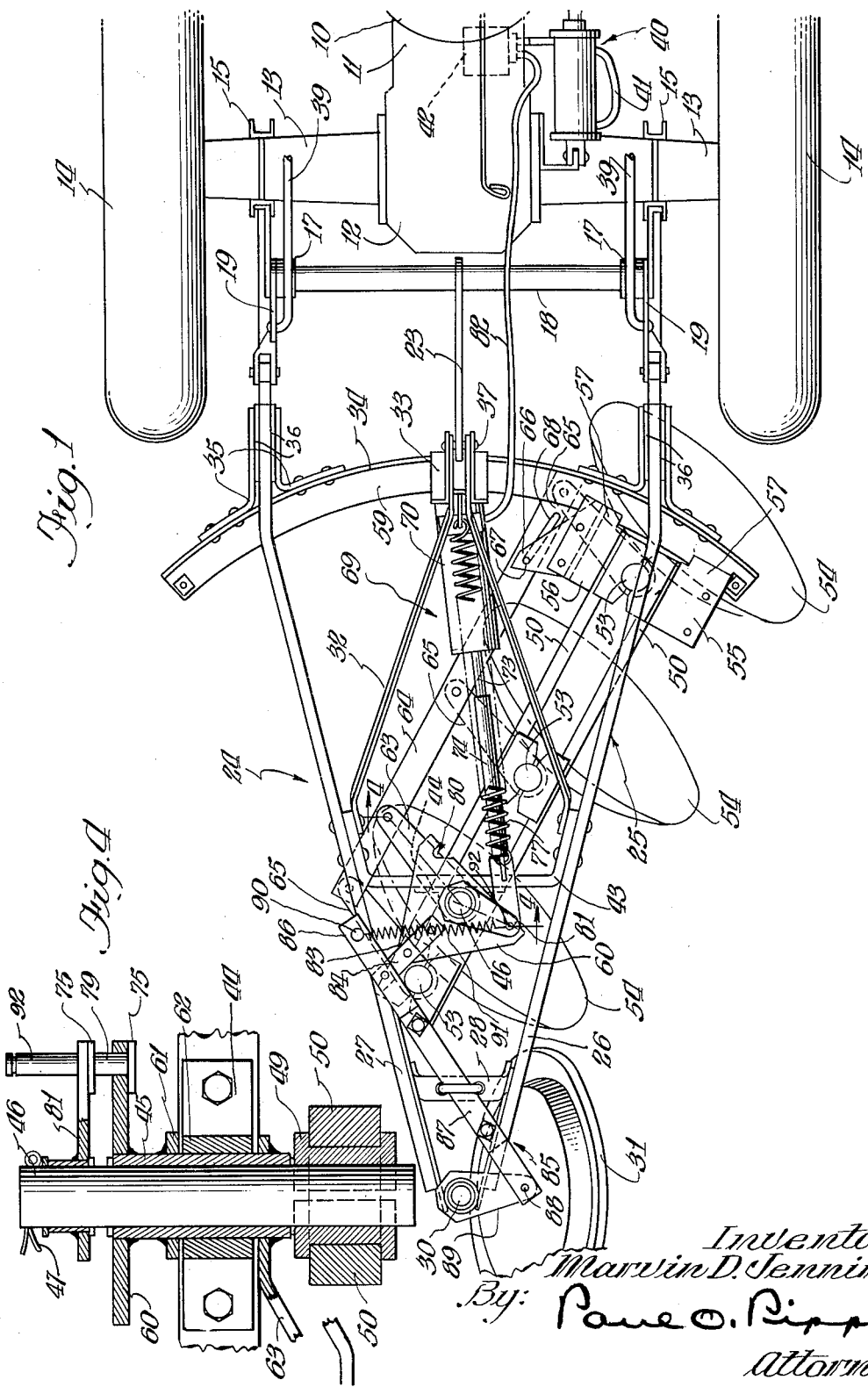
Fig. 1 is a plan view of a two-way disk plow embodying the features of this invention and mounted upon the rear end of a tractor.
Figure 2:
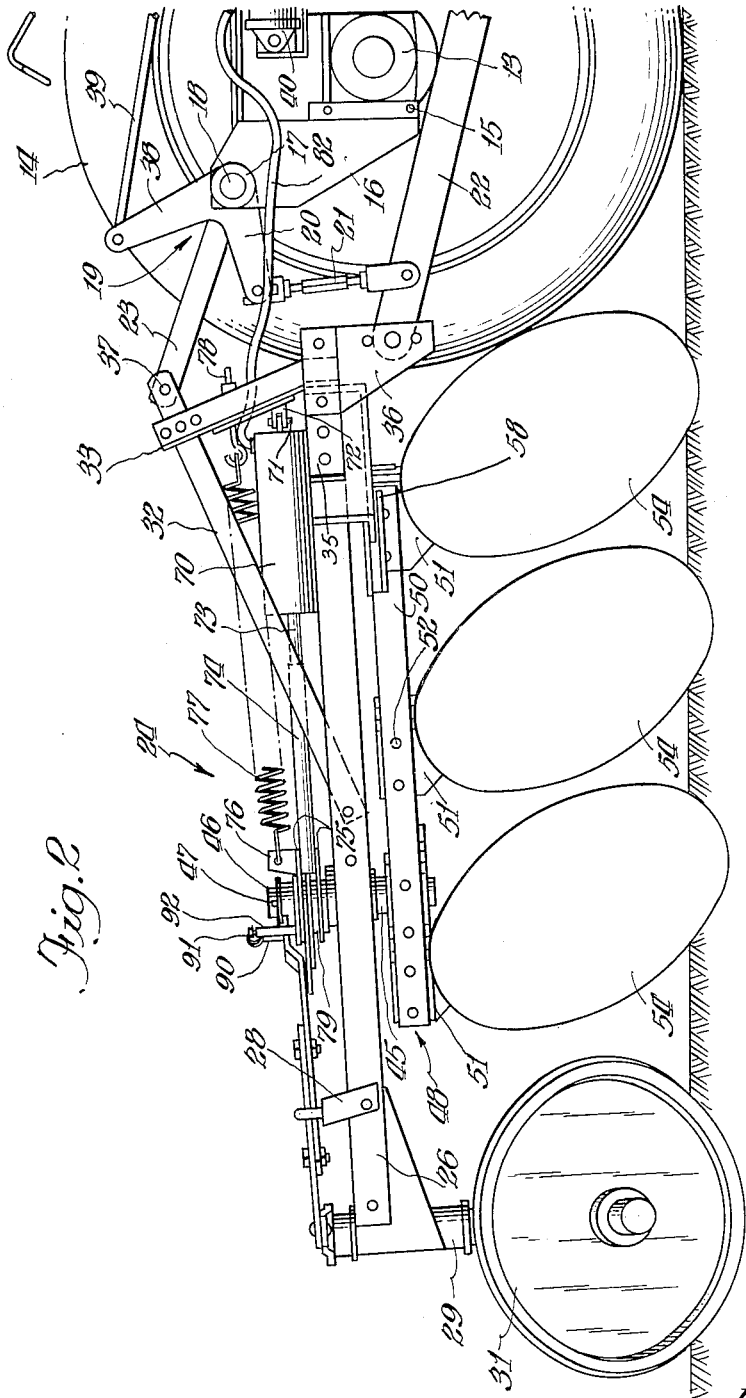
Fig. 2 is a side elevation of the structure shown in Fig. 1 with the disks in operating position.

Referring to the drawings, the numeral 10 designates the longitudinally extending body of a tractor having a power plant 11, a transmission housing 12, laterally extending axle housings 13, and rear drive wheels 14. Rear axle housings 13 have secured thereto laterally spaced clamps 15, each of which has mounted thereon a standard 16 provided with bearings 17 adapted to rotatably receive the ends of a transverse rock shaft 18 extending across the back of the tractor parallel to the rear axle housings. At each end of the shaft 18 is affixed a bell-crank 19, each of which has a rearwardly extending arm 20 connected by an adjustable link 21 to laterally spaced links 22 pivotally connected to the tractor by means, not shown, for vertical swinging movement thereof. Generally parallel to these links 22 and vertically spaced thereabove is another link 23 which is secured to the rock shaft 18. The links 22 and 23 function as the attaching mechanism by which the two-way disk plow, designated by the numeral 24 and embodying the features of this invention, is attached to the tractor to be propelled thereby over a field to be plowed and to be lifted thereon for transport.

The two-way plow of this invention comprises a longitudinally extending supporting frame 25 generally triangular in shape and formed of a pair of laterally spaced rearwardly converging frame bars 26 and 27, the rear ends of which are connected by a cross brace 28 and between said rear ends there is secured a vertically extending bearing 29 in which is rotatably mounted the vertical portion 30 of an axle which is bent downwardly and outwardly at its lower end to provide for the mounting thereon of a rear furrow wheel 31 upon which the rear end of the implement is supported. A pair of straps 32 are secured to the bars 26 and 27 and converge forwardly and upwardly and their forward ends are supported upon a standard 33 secured to and extending upwardly from an arcuately shaped angle bar 34 affixed to the forward ends of the bars 26 and 27 by straps 35. Also secured to the straps 35 at opposite sides of the plow frame are depending plates 36 to each of which is pivotally connected one of the links 22. The ends of straps 32 extending beyond the standard 33 carry a pivot pin 37 to which is pivotally connected the rear end of the upper link 23. The implement 24 may be vertically moved between operating and transport positions by rocking the shaft 18, and this is accomplished by the connection to arm 38 of bell crank 19 at each end of the rock shaft 18 of a lifting rod 39. Power is transmitted to the lifting rods 39 to move them forwardly and rearwardly for lifting the implement through suitable connecting mechanism, not shown, deriving power from a hydraulic ram 40 mounted upon the side of the tractor and connected by fluid hose 41 to a pump 42 or other source of fluid under pressure, indicated in Fig. 1, deriving power from the tractor power plant.

Between the frame bars 26 and 27 there is provided intermediate their ends a transverse brace 43 to which is secured a clamp 44. Clamp 44 supports a vertically extending bearing sleeve 45 in which is rotatably received a spindle 46 secured against displacement by one or more pins 47.

An elongated tool carrying sub-frame 48 is affixed to the lower end of the spindle 46 by a clamp 49. Sub-frame 48 extends diagonally with respect to a longitudinal center line through the main supporting frame 25 in operating position and comprises a pair of laterally spaced beams 50 secured to the clamp 49. The beams 50 are mounted near their rear ends upon the spindle 46 and support therebetween at spaced locations from front to rear a plurality of bearing blocks 51 affixed to the beams by bolts 52 and support for rotation vertically extending spindles 53, each of which carries at its lower end an earth penetrating disk 54.

Figure 3:
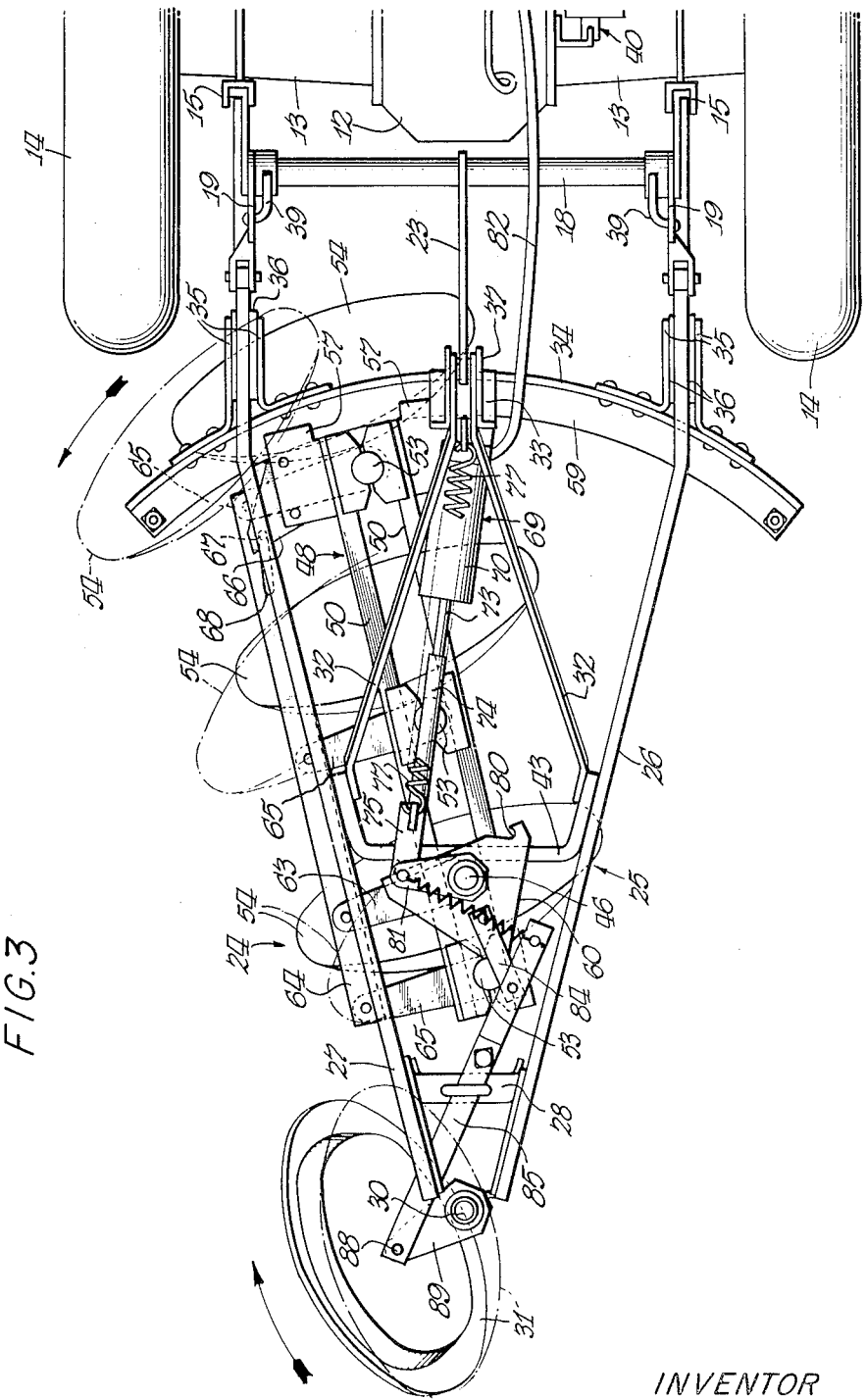
Fig. 3 is a plan view showing the disk gang as it is being shifted to its alternative operating position.

To the forward end of the sub-frame 48 and secured to and extending laterally from the beams 50 thereof are plates 55 and 56. Each of these plates has forwardly extending vertically spaced projections 57 and 58 which confine therebetween the rearwardly extending horizontal flange 59 of the arcuately shaped angle bar 34 connecting the forward ends of the frame bars 26 and 27. Flange 59 serves as a guide rail to prevent relative vertical movement of the front end of the sub-frame 48 and to accommodate sliding of the plates 55 and 56 on the flange 59 when the sub-frame is swung laterally from one operating position such as shown in Fig. 1 to its other operating position for reversing the direction of plowing as indicated in Fig. 3.

Lateral swinging of the sub-frame 48 about its pivot on the spindle 46 is accomplished by mechanism including a triangular shifter plate 60 secured as by welding to the bearing sleeve 45 rotatably mounted on spindle 46. Also secured as by welding to the bearing sleeve 45 is a spacing collar 61, and the sleeve is rotatable in a bearing 62 carried by the clamp 44. Also secured as by welding to the bearing sleeve 45 below the bearing 62 is an arm 63 which extends laterally outwardly from the sub-frame 48 and is pivotally connected to a bar 64 as clearly shown in Figs. 1 and 3. Bar 64 extends parallel to the sub-frame 48 and laterally spaced therefrom and has pivotally connected thereto at spaced locations thereon a plurality of arms 65 which extend laterally from the respective disk spindles 53 and are fixed thereto. Thus it should be clear that upon rocking of the plate 60 about its pivot on the spindle 46, motion is transmitted to the arm 63 which in turn moves the bar 64 longitudinally in a direction parallel to the sub-frame 48. Motion is therefore also imparted through the arms 65 to rotate the spindles 53 upon which the disks 54 are mounted for a purpose which will hereinafter become clear.

In order to transmit motion from the plate 60 and arm 63 to swing the sub-frame 48 laterally about its pivot on the spindle 46, an extension 66 is provided for the plate 56 at the forward end of sub-frame 48 which is secured to the plate 56 by suitable bolts. A pin 67 projects downwardly from the extension 66 and is slidably received in a slot 68 formed in the forward end of the bar 64. Thus it should be clear that the bearing sleeve 45, with the plate 60 and arm 63 affixed thereto, is rotatable on the pin 46 relative to the clamp 49 and beam 50, a distance determined by the extent of said slot. Upon rocking the plate 60 and transmitting motion to the arm 63, the bar 64 is moved until the pin 67 engages one end of slot 68 whereupon motion is transmitted to the sub-frame 48 to swing it laterally.

In Fig. 1 it will be observed that the disks 54 occupy an angle more than 90° with respect to the sub-frame 48. Therefore, upon reversing the direction of plowing and shifting the disk gang laterally to the other side of its supporting frame as indicated in Fig. 3, additional adjustment must be made in the angle of the disks 54 which respect to their supporting frame. This additional motion is supplied by the rotation imparted to spindles 53 through arms 65 and the bar 64. In Fig. 3 the disk gang has not reached the limit of its lateral shifting but this is indicated by dotted lines. The mechanism by which the disks are caused to assume the proper plowing angle when the plow is reversed is the subject of a separate U. S. application, Serial No. 232,514, filed June 20, 1951, in the name of James Morkoski.

Motion transmitting means for rocking plate 60 to reverse the position of the disk gang with respect to its supporting frame is supplied by force exerting means including a ram unit 69. Ram unit 69 comprises a cylinder 70 pivotally mounted upon a pivot pin 71 carried by a clevis 72 affixed to the standard 33 centrally of the main supporting frame 25 for lateral swinging movement of the cylinder. Slidably receivable in the cylinder for extension and retraction with respect thereto is a piston rod 73 which in turn is slidably receivable in a sleeve 74 having a closed rear end against which the rod 73 is adapted to abut in its extended position. Sleeve 74 has affixed as by welding to the rear end thereof vertically spaced generally horizontal plates 75 to the upper of which is welded a vertically extending lug 76. Lug 76 serves as an anchor for one end of a spring 77, the other end of which is connected to an eye-bolt 78 adjustably carried by the standard 33, the function of which will hereinafter become clear.

Between the ends of the plates 75 there is mounted a pin 79 which is arranged to engage laterally projecting portions of the shifter plate 60 for the purpose of rocking the latter. Shifter plate 60 is rocked in opposite directions by engagement of the pin 79 with the plate at opposite sides of the spindle 46 to alternately swing the disk gang 48 from one operating position to the other. Rocking of the shifter plate 60 is accomplished by extension of the piston rod 73 in the cylinder 70, the rod acting through the sleeve 74 and pin 79 to engage and rock the shifter plate. The shifter plate 60, as pointed out before, has portions extending laterally from opposite sides of its pivot on the spindle 46, and these laterally extending portions function as lever arms for transmitting motion through the shifter plate to shift the disk gang. A recess or notch 80 is provided in the shifter plate along the forward edge thereof on opposite sides of the spindle 46 for reception of the pin 79 to provide a positive engagement therewith. The distance from the axis of spindle 46 to each of said notches, therefore, constitutes a lever engageable by the pin 79 for rocking of the shifter plate in response to actuation of the cylinder.

The ends of the plates 75 are also pivotally connected by pin 79 to the end of an arm 81 which is mounted upon the spindle 46 for rotation relative thereto. The ram unit 69 is of the single acting one-way type and is supplied with fluid under pressure through a hose 82 connected to a source of fluid pressure such as the pump 42 indicated in dotted lines in Fig. 1. Fluid under pressure is supplied from the pump 42 to the cylinder 70 to extend the piston rod and exert force through the sleeve 74 to rock the shifter plate 60. Upon the release of the fluid from the cylinder the piston 73 is retracted into the cylinder 70 and the sleeve 74 therewith, with the assistance of the spring 77. Upon collapse of the ram unit, the arm 81, the sleeve 74 and rod 73, and the pivot pin 71 of the cylinder 70 assume a position in substantial alignment between the notches 80 of the shifter plate. In this position the ram unit is ineffective to place the pin 79 in either of the recesses 80 of the shifter plate for rocking the latter. Therefore means are provided for moving the pivotal connection of arm 81 with plates 75 over-center with respect to the spindle 46 and the connection of the cylinder to the frame. This mechanism is now to be described.

Secured to the apex 83 of the triangular shifter plate 60 is a strap 84 to which a link 85 is pivotally connected intermediate its ends. Link 85 has a portion 86 extending forwardly from the strap 84 and a portion 87 extending rearwardly therefrom for pivotal connection at its rear end to a pin 88 carried at the end of an arm 89 affixed to the upper end of the axle 30. It may be observed that upon rocking of the arm 89 the furrow wheel 31 moves in an arc from the position of Fig. 1 to the position of Fig. 3 in which it is shown that the furrow wheel 31 is moving from a position on one side of the main supporting plow frame to the other side thereof when the direction of plowing is fully reversed. The reversed position of the furrow wheel is indicated in dotted lines in Fig. 3. Motion is thus transmitted through the shifter plate 60 and the link 85 to swing the furrow wheel 31 from one position to another, and this is accomplished simultaneously with swinging of the disk gang from one position to another.

Upon the end 86 of link 85 and extending upwardly therefrom is a post 90 to which is anchored one end of a spring 91, the other end of which is anchored to a post 92 secured to and extending upwardly from the arm 81 mounted on spindle 46. Spring 91 moves from the position shown in Fig. 1 to the position shown in Fig. 3 upon reversing the direction of operation of the plow, and functions in the manner shown to bias or urge the pivotal connection of arm 81 with sleeve 74 toward the other notch 80 in the shifter plate so that upon the subsequent extension stroke of the ram unit the plate will be rocked in the direction to reverse the operation of the plow. In Fig. 3 the pin 79 has already engaged the notch 80 in the shifter plate to move the disk gang into the position shown. Upon completion of this movement of the disk gang into operating position the fluid is released by the operator from the cylinder 70 and the spring 74 again acts to return the arm 81 and sleeve 74 into alignment. The spring 91 then assumes the position for biasing the pivot pin 79 off-center in the opposite direction in preparation for a subsequent reversal of the direction of plowing and reversal of the position of the disk gang.

The hydraulic power transmission mechanism deriving power from the tractor and including the ram units 40 and 69 and the pump 42 preferably also includes the use of a suitable valve system of the delay-type for discharging fluid under pressure from the pump to the ram units. This delayed valve operation may be of the type described, for example, in Lindgren et al. Patent 2,213,401. In such an arrangement fluid under pressure from the pump is first directed to the ram unit 40 for the purpose of raising the implement into transport position upon the tractor. Upon completion of this lifting the valve controlling the flow of fluid under pressure to ram unit 69 automatically opens and the ram unit 69 functions to reverse the position of the gang of disks for plowing in the opposite direction while the implement is in an inoperative position so that upon turning of the tractor at the end of the field, the implement will be in position for the return trip.

It is believed that the two-way disk plow of this invention and described herein will be clearly understood from the foregoing description. It should be understood, however, that the invention has been described only in its preferred embodiment and that modifications may be made therein without departing from the spirit of the invention or the scope of the appended claims.

What is claimed is:

1. Reversing mechanism for a two-way disk plow or the like having a main frame, a disk-carrying sub-frame and means mounting the latter on the main frame for lateral swinging movement relative thereto, comprising a vertically extending spindle secured to the rear portion of the sub-frame, a bearing carried by the main frame rotatably supporting said spindle for rotation about its axis, a plate member mounted on said spindle and connected to the sub-frame to effect swinging thereof upon swinging of the plate about the axis of the spindle, said plate member having notches formed therein at opposite ends of one edge thereof at laterally opposite sides of said spindle, an arm rotatably mounted on said spindle, a projection associated with said arm alternately receivable in said notches upon swinging of the arm laterally, means operative upon swinging of the disk-carrying sub-frame from one side to the other of the main frame for biasing said arm toward one of said notches, and force exerting means connected to said arm operative to force said projection into said one of said notches in said plate member and to swing the plate member about the axis of the spindle.

2. Reversing mechanism for a two-way disk plow or the like having a main frame, a disk-carrying sub-frame and means mounting the latter on the main frame for lateral swinging movement relative thereto, comprising a vertically extending spindle secured to the rear portion of the sub-frame, a bearing carried by the main frame rotatably supporting said spindle for rotation about its axis, a plate member mounted on said spindle and connected to the sub-frame to effect swinging thereof upon swinging of the plate member about the axis of the spindle, said plate member having notches formed therein at opposite ends of one edge thereof at laterally opposite sides of said spindle, an arm rotatably mounted on said spindle, a projection associated with said arm alternately receivable in said notches upon swinging of the arm laterally, means operative upon swinging of the disk-carrying sub-frame from one side to the other of the main frame for biasing said arm toward one of said notches, means for reversing the direction of operation of said biasing means upon reversing the position of the sub-frame, whereby said projection is urged alternately toward opposite notches in said plate member, and force exerting means connected to said arm operative to force said projection into said one of said notches in said plate member and to swing the plate member about the axis of the spindle.

3. Reversing mechanism for a two-way disk plow or the like having a main frame, a disk-carrying sub-frame and means mounting the latter on the main frame for lateral swinging movement relative thereto, comprising a vertically extending spindle secured to the rear portion of the sub-frame, a bearing carried by the main frame rotatably supporting said spindle, a plate member mounted on said spindle extending laterally from opposite sides thereof and connected to said sub-frame to effect swinging thereof upon swinging of the plate member about the axis of the spindle, a force exerting rod member mounted on the frame having a part thereon arranged to alternately engage opposite ends of said plate member, whereby to swing the latter and the disk-carrying sub-frame alternately to opposite sides of a longitudinal center line through the main frame upon a force exerting stroke of said rod member, an arm rotatably mounted on said spindle, pivot means connecting the ends of said arm and rod member, said arm being swingable to opposite sides of a straight line through the rod member, the spindle and the pivotal connection of the arm and rod member to position said part alternately adjacent opposite ends of the plate member, and means actuated by the swinging of the plate member in one direction operable to bias said pivotal connection of the arm and rod member from said straight line in a direction to position said part adjacent the opposite end of the plate member to reverse the position of the disk-carrying sub-frame upon the next force-exerting stroke of the rod member.

4. The invention set forth in claim 3, further characterized by the fact that the biasing means urging the pivotal connection of the arm and rod member over-center is a spring connected to the plate member and to the arm.

5. The invention set forth in claim 3, further characterized by the fact that the rod member for swinging the plate member comprises a sleeve member connected to the arm and a piston rod slidably receivable in the sleeve and forming part of a ram unit mounted on the main frame.

6. A reversible disk plow adapted for mounting upon a tractor having a power plant and power lift mechanism thereon for raising the plow for transport, comprising a longitudinally extending supporting frame, a vertically extending spindle carried by the frame for rotation about its axis, a generally longitudinally extending gang of disks secured near its rear end to the spindle for lateral swinging of the disk gang upon rotation of the spindle to opposite sides of a longitudinal center line through the frame, means on the frame supporting and guiding the forward end of the disk gang throughout the range of lateral swinging thereof, a single-acting ram carried by the plow receiving fluid under pressure from the tractor and including a cylinder anchored to the supporting frame, a piston rod in said cylinder extensible upon the admission of fluid thereto and retractable upon release of the fluid pressure, a shifter plate mounted on said spindle operatively connected to the disk gang and rockable to swing the latter laterally with swinging of said shifter plate, and a part carried by the piston rod alternately engagable upon extension of the rod with the shifter plate at opposite sides of the axis of said spindle to shift the disk gang from one plowing position to the other.

7. A reversible disk plow adapted for mounting upon a tractor having a power plant and power lift mechanism thereon for raising the plow for transport, comprising a longitudinally extending supporting frame, a vertically extending spindle carried by the frame for rotation about its axis, a generally longitudinally extending gang of disks secured near its rear end to the spindle for lateral swinging of the disk gang upon rotation of the spindle to opposite sides of a longitudinal center line through the frame, means on the frame supporting and guiding the forward end of the disk gang throughout the range of lateral swinging thereof, a single-acting ram carried by the plow receiving fluid under pressure from the tractor and including a cylinder anchored to the supporting frame, a piston rod in said cylinder extensible upon the admission of fluid thereto and retractable upon release of the fluid pressure, a shifter plate mounted on said spindle operatively connected to the disk gang and rockable to swing the latter laterally with swinging of said shifter plate, a part carried by the piston rod and engageable with the plate to turn the spindle and shift the disk gang laterally from one plowing position to the other, and means actuated by the movement of the disk gang from one plowing position to the other upon extension of the piston rod to alternately bias the piston rod and the part thereon into engagement with the shifter plate at opposite sides of the axis of the spindle.

8. In reversing mechanism for a two-way disk plow or the like adapted for mounting upon a tractor including a longitudinally extending main frame and a gang of disks adapted for alternate plowing in opposite directions, a vertically extending spindle rotatably carried by the frame and secured to the disk gang, a single-acting fluid cylinder pivotally anchored to the frame receiving fluid under pressure from the tractor and having a piston rod extensible therein, said piston rod being retractable upon release of the fluid pressure, lever arms secured to the spindle extending laterally from opposite sides thereof and operatively connected to the disk gang, and means for transmitting power from the cylinder and piston unit to alternately rock said lever arms to shift the disk gang from one operating position to the other including a part on the piston rod alternately engageable with said lever arms upon the extension stroke of the piston rod to shift said gang from one operating position to the other.

9. In reversing mechanism for a two-way disk plow or the like adapted for mounting upon a tractor including a longitudinally extending main frame and a gang of disks adapted for alternate plowing in opposite directions, a vertically extending spindle rotatably carried by the frame and secured to the disk gang, a single-acting fluid cylinder pivotally anchored to the frame receiving fluid under pressure from the tractor and having a piston rod extensible therein, said piston rod being retractable upon release of the fluid pressure, lever arms secured to the spindle extending laterally from opposite sides thereof and operatively connected to the disk gang, means for transmitting power from the cylinder and piston unit to alternately rock said lever arms to shift the disk gang from one operating position to the other including a sleeve slidably receiving the piston rod and having a part thereon alternately engageable with said lever arms upon extension of the piston rod to shift the disk gang from one operating position to the other, an arm rotatable on the spindle, a pivotal connection between the arm and the sleeve, a spring connecting the cylinder and the sleeve for retracting the latter with the piston rod to a position between said lever arms upon withdrawing the fluid from the cylinder, and means biasing the piston rod and sleeve from said position toward one of the lever arms in response to shifting of the gang to one of its positions.

10. The invention set forth in claim 9, further characterized by the fact that the said biasing means is a spring operatively connected to the said lever arms and the pivotal connection of said arm and said sleeve.

11. In reversing mechanism for a two-way disk plow or the like adapted for mounting upon a tractor having a source of fluid pressure and including a supporting frame and a gang of disks adapted to be moved between two positions for alternate plowing in opposite directions, means pivotally connecting the gang to the frame for lateral swinging movement including means serving as a vertical spindle, levers extending laterally from opposite sides of the spindle, a ram unit including a fluid cylinder pivotally mounted on the frame, a piston rod slidable in the cylinder, a sleeve slidable on the rod, an arm rotatable on the spindle pivotally connected to the sleeve, said arm and sleeve being swingable to opposite sides of the spindle for alternate engagement with said levers to swing the disk gang, a spring connecting the sleeve and cylinder and operable upon withdrawal of fluid from the cylinder to retract the sleeve with the piston rod to a position between said levers with the spindle, the pivotal connection of the arm to the sleeve and the connection of the cylinder to the frame in substantial alignment, and another spring actuated by movement of the disk gang from one position to the other and connected to the arm at the pivotal connection thereof with the sleeve for moving said pivot from said position.

12. In a two-way disk plow or the like adapted for mounting upon a tractor having a source of fluid pressure, wherein a gang of disks is mounted on a supporting frame on a vertical spindle for lateral swinging between two positions for alternate plowing in opposite directions, a plate member mounted on the spindle operatively connected to the gang and rockable to move the gang, a one-way fluid cylinder pivotally mounted on the frame and receiving fluid under pressure from the tractor source, a piston rod in the cylinder and a sleeve slidably receiving the rod, said sleeve having a part engageable upon extension of the rod in the cylinder with said plate member at one side of the spindle to move the disk gang from one plowing position to the other, a spring connecting the cylinder and the sleeve to retract the latter upon retraction of the piston rod, and means actuated by movement of the disk gang upon extension of the piston rod operative to shift said sleeve laterally to a position for engagement of said part with the plate member at the other side of said spindle, whereby to reverse the position of the disk gang upon the next extension stroke of the piston rod.

13. In a two-way disk plow or the like adapted for mounting upon a tractor having a source of fluid pressure, wherein a gang of disks is mounted on a supporting frame on a vertical spindle for lateral swinging between two positions for alternate plowing in opposite directions, a plate member mounted on the spindle operatively connected to the gang and rockable to move the gang, a one-way fluid cylinder pivotally mounted on the frame and receiving fluid under pressure from the tractor source, a piston rod in the cylinder and a sleeve slidably receiving the rod, said sleeve having a part engageable upon extension of the rod in the cylinder with said plate member at one side of the spindle to move the disk gang from one operating position to the other, a spring connecting the cylinder and the sleeve to retract the latter upon retraction of the piston rod, a link pivotally connected to the spindle and to the sleeve, said link and sleeve being in alignment with said spindle upon retraction of the piston in the cylinder, and means actuated by movement of the disk gang upon extension of the piston rod operative to bias the link and sleeve out of alignment to a position for engagement of said part with the plate member at the other side of said spindle, whereby to reverse the position of the disk gang upon the next extension stroke of the piston rod.

14. In a two-way disk plow or the like adapted for mounting upon a tractor having a source of fluid pressure, wherein a gang of disks is mounted on a supporting frame on a vertical spindle for lateral swinging between two positions for alternate plowing in opposite directions, a plate member mounted on the spindle operatively connected to the gang and rockable to move the gang, a one-way fluid cylinder pivotally mounted on the frame and receiving fluid under pressure from the tractor source, a piston rod in the cylinder and a sleeve slidably receiving the rod, said sleeve having a part engageable upon extension of the rod in the cylinder with said plate member at one side of the spindle to move the disk gang from one operating position to the other, a spring connecting the cylinder and the sleeve to retract the latter upon retraction of the piston rod, a link pivotally connected to the spindle and to the sleeve, said link and sleeve being in alignment with said spindle upon retraction of the piston in the cylinder, and means actuated by movement of the disk gang upon extension of the piston rod operative to bias the link and sleeve out of alignment to a position for engagement of said part with the plate member at the other side of said spindle, whereby to reverse the position of the disk gang upon the next extension stroke of the piston rod, said biasing means comprising a spring operatively connected between said plate member and the pivotal connection of said link and said sleeve and arranged to exert force to swing said link alternately to opposite sides of the spindle upon movement of the disk gang from one position to the other.

References Cited in the file of this patent

UNITED STATES PATENTS

| | | |
|---|---|---|
| 2,041,216 | Sjogren | May 19, 1936 |
| 2,084,629 | Coviello | June 22, 1937 |
| 2,163,832 | Coviello | June 27, 1939 |
| 2,561,032 | Onfrey | July 17, 1951 |
| 2,578,942 | Onfrey | Dec. 18, 1951 |
| 2,672,801 | Barrett | Mar. 23, 1954 |